US006807459B2

(12) United States Patent
Rosenbaum et al.

(10) Patent No.: US 6,807,459 B2
(45) Date of Patent: Oct. 19, 2004

(54) SYSTEM AND METHOD FOR PRODUCTION AND DISTRIBUTION OF MAIL PIECES FOR MASS MAILINGS

(75) Inventors: Walter Rosenbaum, Paris (FR); Karlheinz Reich, Radolfzell (DE)

(73) Assignee: Siemens Aktiengesellschaft, München ( * ) Notice: Subject to any disclaimer, the term of this patent is extended or adjusted under 35 U.S.C. 154(b) by 97 days.

(21) Appl. No.: 10/232,702

(22) Filed: Sep. 3, 2002

(65) Prior Publication Data

US 2003/0055869 A1 Mar. 20, 2003

Related U.S. Application Data

(63) Continuation of application No. PCT/DE01/00874, filed on Mar. 8, 2001.

(30) Foreign Application Priority Data

Mar. 14, 2000 (DE) ........................................ 100 12 236

(51) Int. Cl.[7] .................................................. G06F 7/00
(52) U.S. Cl. ........................ 700/223; 700/224; 700/227
(58) Field of Search ................................ 700/223, 224, 700/225, 226, 227; 209/584, 900

(56) References Cited

U.S. PATENT DOCUMENTS 5,802,503 A * 9/1998 Sansone ..................... 705/401
5,873,073 A * 2/1999 Bresnan et al. ............. 700/220
5,918,220 A * 6/1999 Sansone et al. ............. 705/408
5,953,427 A * 9/1999 Cordery et al. ............... 380/51
6,674,038 B1 * 1/2004 Latta .......................... 700/224

FOREIGN PATENT DOCUMENTS

DE 19650875 C1 10/1997
EP 0536640 B1 1/1999
WO WO99/21330 4/1999
WO WO01/68274 9/2001

OTHER PUBLICATIONS

Derwent Abstract for DE19650875.
Patent Abstracts of Japan, Abstract for Japanese Application No. 04313859, published Jun. 10, 1994.

* cited by examiner

*Primary Examiner*—Gene O. Crawford
(74) *Attorney, Agent, or Firm*—Jacob Eisenberg; Siemens AG

(57) ABSTRACT

A system and method for mass mailing is disclosed which operates from the perspective of the receiver. Herein, data comprising mass mail items is electronically distributed to a receiving center where it is sorted by region, then to a service center assigned to the region. At the service center, the data is again sorted by the line of route distribution which includes the addressee address and the data is printed. The printed data is then stuffed into envelopes. Alternatively, an envelope face layout may also be included in the data and printed on the envelope. The envelope, comprising the mail item, is then distributed to the local distribution center, where the mail item is delivered, the mail item having been received in the line of route distribution order. Alternatively, the printing may be performed at the distribution center.

19 Claims, 7 Drawing Sheets

SYSTEM AND METHOD FOR PRODUCTION AND DISTRIBUTION OF MAIL PIECES FOR MASS MAILINGS

CROSS-REFERENCE TO RELATED APPLICATIONS

The present application is a continuation of International Application number PCT/DE01/00874, filed Mar. 8, 2001, and German Application number 100 12 236.1 filed Mar. 14, 2000, both of which are incorporated herein by reference.

BACKGROUND OF THE INVENTION

The present invention relates to the production and distribution of mail pieces for mass mailing and more particularly to the more efficient use of hybrid mail. Per the present invention, data concerning mail piece content, addressee information and the like, is electronically transmitted to a service center wherein mail pieces directed to the addressee are automatically produced with respect to line of route distribution including addressee address. By making this sorting step electronically and in advance of mass mail item printing, substantial resources are saved.

Mass mailing is a frequent tool for banks, advertising agencies and the like. Data, such as addressee name and address, letter content, and the like, must be provided to facilitate printing of mail items for mass mailing. The letter contents are printed, if necessary stuffed into envelopes via envelope stuffing machines, and sent to the closest post office or outgoing sorting center. The stuffed envelopes are then "out-sorted" (normally according to city, resp. postal code) and transported to the incoming center where they are "in-sorted" according to street name. The last sorting process happens at a delivery center, where the letter carrier sorts the mail in the order of his or her delivery route (line-of-route distribution). Then the letter is delivered. FIG. 1 depicts this current process for mass mailings.

Hybrid mail is an outcome of recent developments in computer technology and electronic communication in particular. Hybrid mail is a cross between conventional paper mail and e-mail. Herein, text and address information is transmitted electronically to a service center wherein the letters are produced. One popular form of hybrid-mail is a bank customers' statement of account. As depicted in FIG. 2, an order goes from a bank to a postal administration for the generating of bank statements. The bank provides relevant data, including bank statement contents, addressee information and the like. The postal administration then sorts the data in such a way that each hybrid mail center receives data for the clients' according to the clients geographic region. The statement may not be presented on neutral paper. Rather, a unique specific bank identifying paper is required. Typically, the hybrid mail center has the corresponding blank forms in stock for each of its customers, the forms being either self-produced or obtained from third parties. This is necessary should leaflets or other information need be inserted with the account statements. The blank forms are put into the printer and customer data is printed thereon, in black/white, in accordance with data provided by the bank. Afterwards, the statements of account are inserted into unprofessionally looking window envelopes and a postage stamp is affixed thereon.

As known from EP 536 640 B1, an alternative process is known wherein envelopes are printed with addresses and envelope contents are printed and inserted therein. Accordingly, it is no longer necessary to use window envelopes. To effect this process, the envelope content is scanned, the address portion defined, and the envelope imprinted with this information. Two printing lines are herein required: one for the content and one for the envelope. Should it be necessary to add leaflets, then this addition would be effected normally by the envelope stuffing machine during the above envelope procedure. The thus produced letters are then transported to the next closest incoming center and further processed along the same lines as conventional mail. A disadvantage to this system lies in the coordination of the printing and the composition of the mail deliveries which becomes expensive and logistically complicated.

Mass mailings current account for 70 to 90% of the total mail volume. Of this, about 5 to 15% start off as hybrid mail and this number depends upon country. This is generally true despite the presence of mail data in electronic form—a major prerequisite for hybrid mail. One major reason for the very limited use of hybrid mail today lies with a lack of economic effectiveness. The only savings, apart from the outgoing sorting process, is in saved transportation of the letters from the outgoing sorting center to the incoming sorting center. This saving is naturally very low with smaller states or countries. On the other hand, it explains why today the degree of application of hybrid mail is the highest in larger countries.

An additional limitation for hybrid mailing lay in the requirement for specialized forms unique to each customer. This become more complicated when leaflets and other insertions are involved. The numerous forms require storage space, stockpiled forms, and other resource commitments. The various forms effectively limit the number of customers and potential for unique mass mailings.

BRIEF SUMMARY OF THE INVENTION

An advantage of the present invention is to make use of the advantages of hybrid mail while doing away with the burdens. An additional advantage is to make mass mailings easier and more available to a wider variety of customers. A further advantage includes the saving of various sorting steps and resources associated therewith. The sorting steps include in-sorting and line of route sorting. These and other advantages will become clear from the present invention which is set out in more detail below.

The present invention achieves these and other advantages by focusing on receiver oriented data rather than the state of the art sender oriented data. In the inventive method, letters are produced in their courier line of route distribution order, with the use of high speed color laser printers located at the service or distribution centers. Given the freedom of laser printing and computer formatting, it is no longer necessary to maintain large stocks of specialized preprinted forms. The data is presorted at a central location prior to printing. The data may be sorted at regional or central service centers which control or maintain at least one database into which the data of new orders of all major customers (banks, insurances, etc.) is fed and sorted according to receiver. Thereafter, the data may be sent to distribution centers which print the mail, in real time or with a built in delay, at the local location. The printing may still occur in a more central or regional location depending upon local requirements. An integrated system may further be used, the system located for example in the service centers and comprising integrated color printers and enveloping stuffing machines. The two may be networked and otherwise centrally controlled. Likewise, the printer may comprise a four color printer, laser, ink jet and the like. With the two, printable leaflets may also be produced on-line and in delivery route order.

A further production item is the creation of the envelope which carries the mass mailing. Herein, data for a color layout of the front side of envelopes associated with select mail pieces is sorted and transmitted along with the contents data. Printing occurs sequentially such that mail items and envelope covers, labels or overlays are printed together. The overlay may then be affixed to the envelopes and the contents stuffed therein. This allows for the production of qualitatively high mail pieces which are indistinguishable from the mail pieces printed on preprinted forms. As such, it is no longer necessary to keep on hand preprinted special envelopes or forms. The completing of the envelopes can occur in another embodiment by pasting the overlay onto the available back side of the envelopes with narrow adhesive straps so as to produce finished envelopes.

To carry out the printing process as economically as possible, it is advantageous to print the transmitted data on sheets. Afterwards, the sheets are separated from each other and cut into any desired or required format. To reduce online separating and cutting, it is also possible to print the single sheets true to format and size.

It is further advantageous to gather all necessary imprints, like receiver address, sender address in graphic design, orders (e.g. change of address, return to sender, etc.), logos, stamps and if requested machine readable distributing codes into the colored layout of the front side of the envelope. No reading of the receiver address is necessary with the OCR reader because of the imprinted machine-readable codes at the coded complete address. This could be necessary for additional mechanical sorting processes and for the integrating with other mail pieces.

In a further advantageous design, the value of the stamps to be printed is determined by a table of rates stored in a database and verified or known beforehand according to the table of the applicable mail item characteristics. The passage of the mail pieces through a separate postage meter machine is therefore no longer necessary.

BRIEF DESCRIPTION OF THE SEVERAL VIEWS OF THE DRAWINGS

The novel features and method steps believed characteristic of the invention are set out in the claims below. The invention itself, however, as well as other features and advantages thereof, are best understood by reference to the detailed description, which follows, when read in conjunction with the accompanying drawings, wherein:

DETAILED DESCRIPTION OF THE INVENTION

Figure 1:
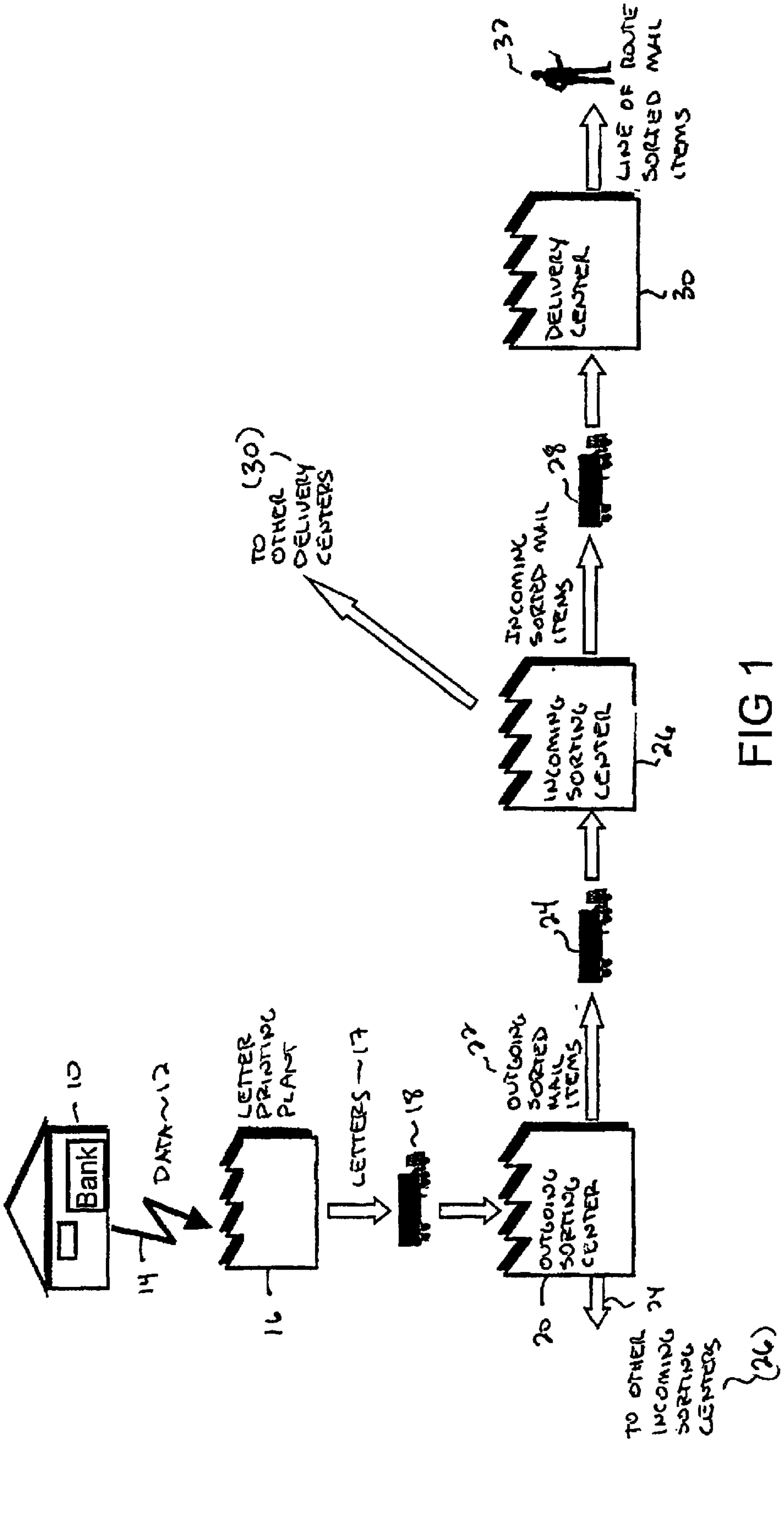
FIG 1 PRIOR ART
FIG. 1 depicts a schematic of known production and distribution of mass mail.

FIG. 1 depicts a prior art embodiment for mass mailing. A bank 10 sends data 12 electronically 14 to a letter printing plant 16. Therein the letters 17 are printed by conventional means. The letters are transported 18 to the outgoing sorting center 20, local to the printing plant 16. The mail is sorted 22 and transported 24 to regional incoming centers local to the addressee 26. Therein, the letters are sorted once more to the local distribution level and transported 28 to local distribution delivery centers 30. At the local level, the letters are sorted once more according to line of route distribution order and delivered 32.

Figure 2:
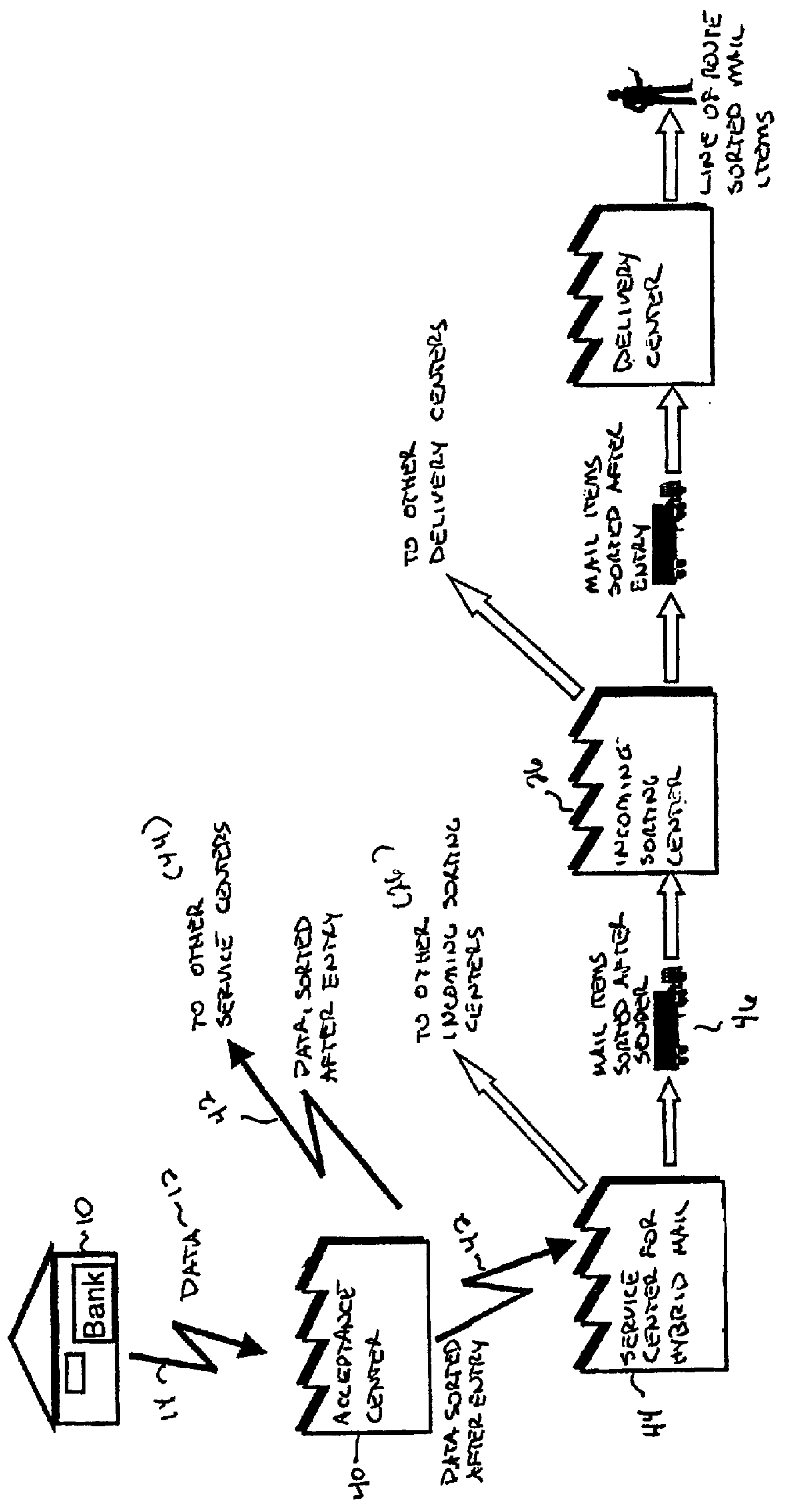
FIG 2 PRIOR ART
FIG. 2 depicts a schematic of known production and distribution of mass mail by sender orientated hybrid mail.

FIG. 2 depicts a prior art embodiment for mass mailing with sender orientation. Herein, the bank 10 sends the data 12 electronically 14 to an acceptance center 40. Therein, the data is sorted and sent 42 to the local or select service centers for hybrid mailings 44. Therein, the mail is printed and sorted (not shown) according to regional incoming sorting centers 26 and transported thereto 46. The method then continues as described above.

Figure 3:
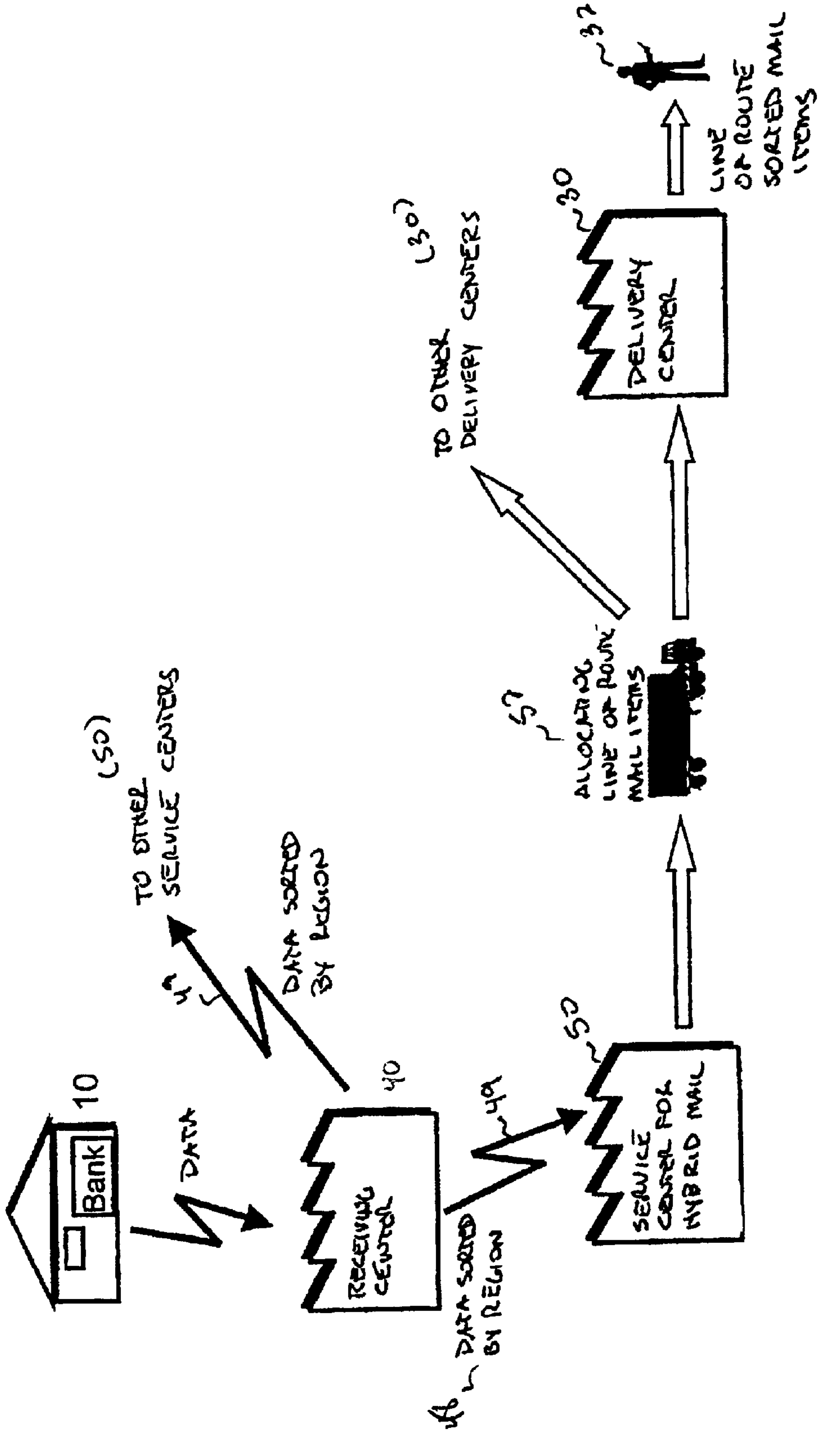
FIG. 3 depicts a schematic for the inventive production and distribution of mass mail by receiver orientated hybrid mail technology.
Figure 4:
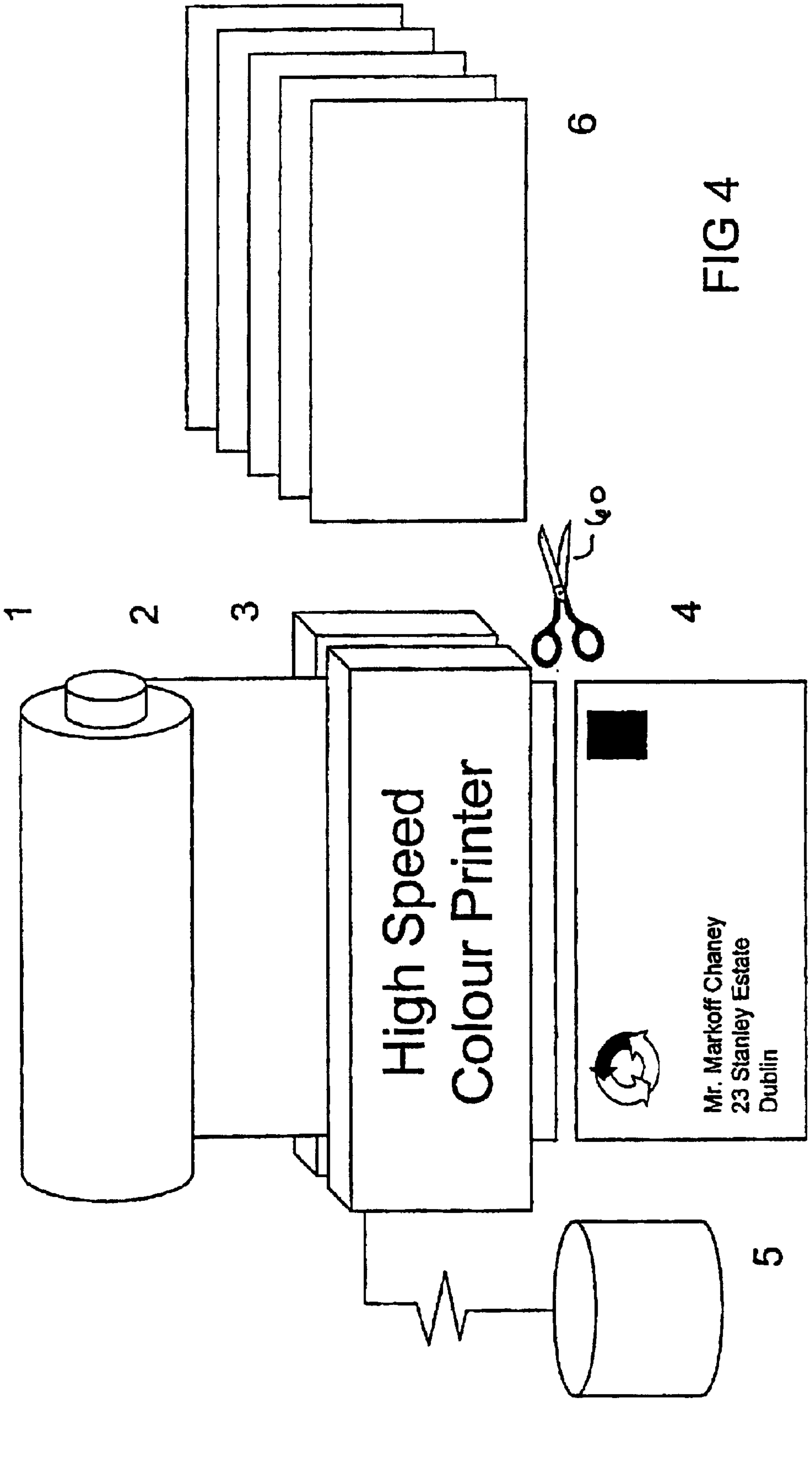
FIGS. 4-7 depicts a schematic run during production of a mail piece.

FIG. 3 depicts a novel embodiment for generating mass mail. Herein, bank 10 forwards 14 data 12 to a receiving or acceptance center 40 wherein data is sorted by region 48 and electronically sent 49 to regional service centers 50 for hybrid mail. Herein, the data is sorted by the local line of route delivery order, printed (not shown) and transported 52 to the local delivery center for direct distribution 32.

At the hybrid mail service center, the data is printed as mail piece contents for the production of the mail pieces and if necessary inserted into the envelopes with further supplements. Afterwards, the envelopes are closed. If window-envelopes are used, then the receiver addresses have to be located only on the documents. These envelopes still have to be stamped and other orders have to be printed. An alternative is to print the overlay with all data in a layout which corresponds to the original layout of the sender, together with the corresponding documents, for each mail piece, and to apply the overlay to the front of the envelope. To accomplish this, an integrated system is located in the hybrid mail service center, the system comprising a fast four color laser printer with corresponding cutting units and enveloping machines which completes the envelopes. Both machines are advantageously connected and operated together. As will be discussed below, the overlay may also be affixed to the back of the envelope. In addition, the location where printing occurs further comprises means for determining how much data has been received and/or how much time has elapsed since the last data. Alternatively, such means may be located at the center which transmits the data and the results therefore forwarded to the printing location should it be different. Accordingly, printing may be controlled by when data exceeds a certain threshold volume and/or a select time has lapsed. Such means and implementation are known in the art, however, use of such means in the method so described is novel.

Figure 5:
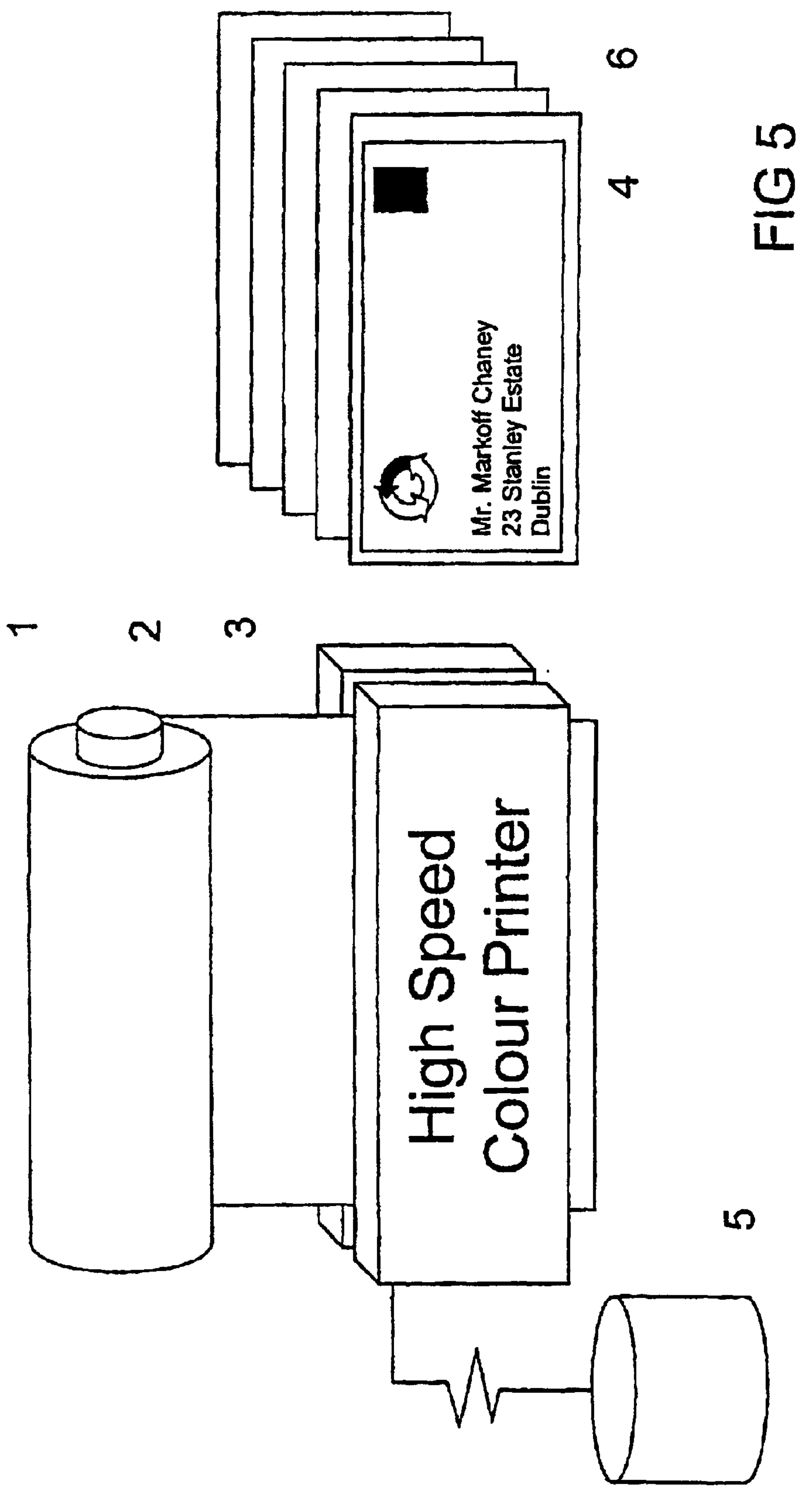
Figure 6:
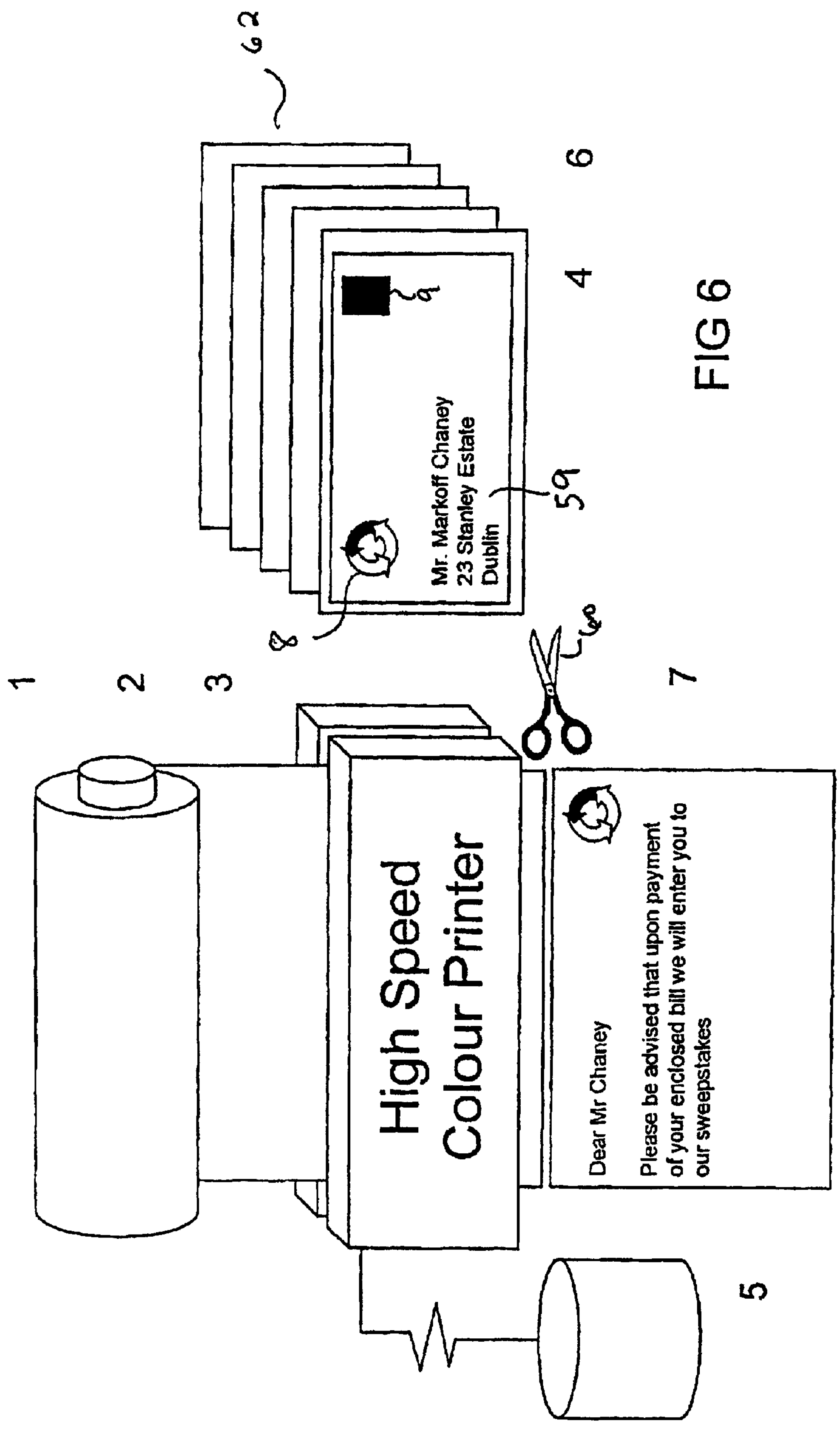

The production process of a mail piece with a printed out envelope front side will now be discussed in more detail with respect to FIGS. 4–7. As set out in FIG. 4, a printer 3, preferably a fast color laser printer, located in, for example, a service center, and prints on sheets 2. Alternatively, the printer may be located at the delivery center, however, for purposes of illustration, the invention will continue as if the printer is located at the service center. The sheets 2 are wound up in coils 1 and are drawn off by the printing. The selection of the colored laser printer 3 with the corresponding printing orders occurs from within data source 5, which was produced either by the senders or in the receiving centers, and transmitted electronically to the service centers. With reference to FIG. 6, the printing occurs such that overly 4 and then contents 7 are printed. Alternatively, the opposite order may be implemented. Overlay 4 comprises, addressee address 59, sender data in graphic design 8, and a printed stamp 9. The value of the stamp is determined with consultation to a rate table, preferably stored in a database and queried with mail piece characteristics. Mail piece characteristics may include size, weight, distance zone, classification (normal delivery, express), and the like. The characteristics are known at the time of posting of the mail piece so that the stamp layout can be transmitted to the envelope. Overlay 4 may further comprise data concerning forwarding orders and the like (not shown). Furthermore, a machine-readable distributing code can be printed on the overlay if requested and/or required. The machine-readable distributing code can be the identification code marking the mail piece to addressee address as assigned by a database. If this occurs in the last service center then the identification number need only identify, for a limited time, the mail piece only in the distributing area of the service center. If the machine-readable distributing codes need be fluorescent, such may be facilitated by an ink jet printer (not shown).

Returning to FIG. 4, the separation of the sheets occur after the printing of overlay 4, as suggested by the disclosed scissors 60. As depicted in FIG. 5, the separated overlay 4 is then affixed on the front face of envelope 6 drawn from stack 62. This process takes place by means known in the art which facilitate synchronized labeling and envelope stuffing. As shown, sheet 2 has a somewhat smaller width than envelope 6 such that the affixing and content inserting can be facilitated without any difficulty.

In an alternate embodiment, overlay 4 may be affixed to the envelope back side. The back side of the envelope may include small adhesive straps at its side edges and at its lower edge. The adhesive straps are produced by folding and adhering narrow projecting ends as well as providing the so accrued straps with an adhesive surface. The upper piece of overlay protrudes over the back side of the envelope and serves as a sealing strap.

Figure 7:
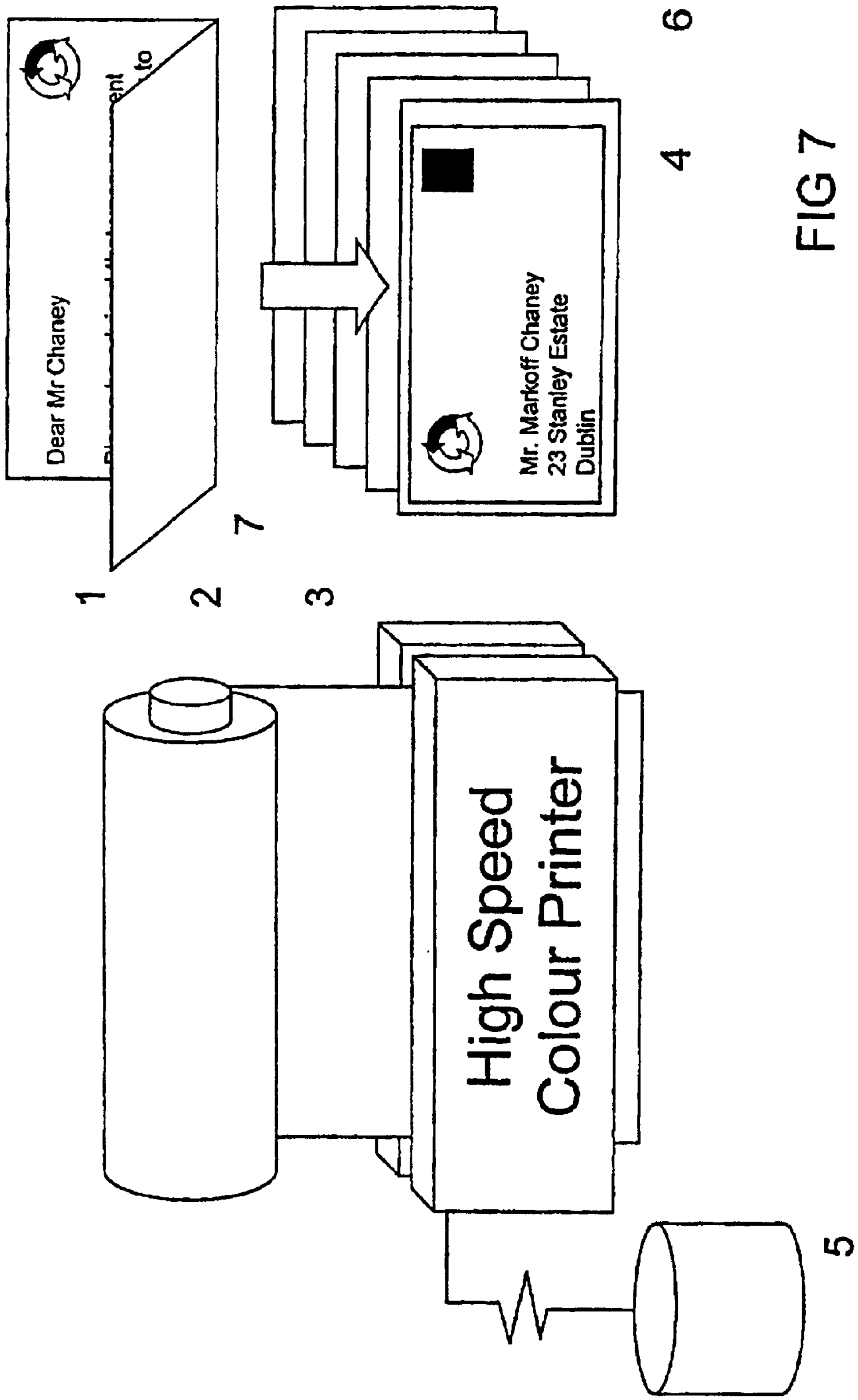

The auxiliary document pages 7 (FIG. 6) are depicted printed after overlay 4 and separated page-wise 60. The documents may comprise text pages with company logo, as disclosed, drawings, images, graphics, etc., as well as combined formats. Afterwards, the document pages 7 are folded and inserted into envelopes 6 with the complete front page layout (FIG. 7). Other insertions into the envelope are also possible, and such would occur here.

At this point the now printed mail items are to be distributed. Such distribution must be made in a particular order. If traditionally produced and sent mail items have to be integrated into this distribution, then inclusion occurs on sequential sorting machines which sort mail items on the basis of machine-readable distributing codes. If the integration is not possible because, for example, the hybrid mail item volume is relatively high for the letter carrier, then a sorting can be abandoned, especially, if the mail items are printed in the distributing order.

The invention being thus described, it will be obvious that the same may be varied in many ways. For example, the mass mailings may be printed and sorted entirely at the distribution centers. Alternatively, such may be performed at a higher level than the hybrid mail servicing centers. In another alternative, the mail items may be printed in select spaced time intervals and/or the amount of data received at the receiving, service and/or delivery centers. Such variations are not to be regarded as a departure from the spirit and scope of the invention, and all such modifications as would be obvious to one skilled in the art are intended to be included within the scope of the following claims.

We claim:

1. A method for mass mailing, comprising the steps of:

receiving data at at least one service center, said data comprises at least one mail item with at least an addressee address and overlay;

sorting said data by line of route distribution which includes said address;

printing said at least one mail item in sorted order and said overlay;

distributing said at least one mail item according to said sorted order; and affixing said overlay to an envelope, said envelope and contents thereof comprising said at least one mail item.

2. The method according to claim 1, wherein said steps of printing and sorting occur at said at least one service center.

3. The method according to claim 1, wherein said steps of printing and sorting occur at a distribution center, said distribution center being locally assigned to distribute mail according to said line of route distribution.

4. The method according to claim 1, further comprising the steps of:

prior to said step of receiving data at at least one service center, receiving data at at least one receiving center;

sorting said data according to addressee region at said at least one receiving center; and transmitting said data to said at least one service center, said at least one service center being assigned to said addressee region.

5. The method according to claim 1, wherein said overlay is affixed to a front face of said envelope.

6. The method according to claim 1, further wherein said step of transmitting to a service center further comprises the step of transmitting data to a receiving center wherein data is sorted to said at least one service center based on said at least one service center location.

7. The method according to claim 1, wherein said data is printed at select time intervals.

8. The method according to claim 1, wherein said data is printed after a threshold amount of data has been received.

9. The method according to claim 1, wherein said overlay is affixed to a back face of said envelope.

10. The method according to claim 9, wherein said envelope further comprises narrow adhesive straps at said envelopes side and lower edges, whereby said overlay protrudes over an upper edge of said back face and folded into a sealing strap.

11. The method according to claim 1, wherein said overlay comprises at least one of addressee address, addresser address in graphic format, orders, logos, stamps and machine-readable distribution codes, said at least one indicated in said data.

12. The method according to claim 11 wherein, value of said stamp is defined by a table of rates stored in a database referenced with characteristics of said at least one mail item.

13. The method according to claim 1, further comprising the steps of printing contents of said envelope sequentially with said overlay.

14. The method according to claim 13, further comprising the step of stuffing said contents into said envelope before said step of printing an overlay.

15. The method according to claim 13, further comprising the steps of:

drawing paper from a source, printing one of said overlay and said contents;

separating said printed one of overlay and contents;

printing another of said overlay and contents; and separating said another of said overlay and contents from said source.

16. The method according to claim 15, further comprising the step of stuffing said contents into said envelope after said step of printing a front face, and using a high speed printer, cutter and envelop stuffing machine to facilitate the steps of drawing, separating said printed one, printing and separating another.

17. A system for mass mailing, comprising:

a receiving center for receiving data comprising said mass mailing and overlay, said receiving center comprising means for receiving said data, sorting said data by addressee region, and transmitting said sorted data to a service center associated with said region;

a service center in electrical communication with said receiving center, said service center comprising means for receiving said sorted data, sorting said sorted data by line of route distribution including addressee address, printing said overlay and said data as mail items according to line of route distribution order and affixing said overlay to an envelope, said envelope and contents thereof comprising at least one mail item;

a delivery center in distribution communication with said service center and assigned to said addressee address, said delivery center comprising means for receiving said mail items and distributing said mail item according to said line of route.

18. The system according to claim 17, wherein said printing is facilitated by a networked printer, cutter and envelope stuffing machine.

19. A system for mass mailing, comprising:

a receiving center for receiving data comprising said mass mailing and overlay, said receiving center comprising means for receiving said data, sorting said data by addressee region, and transmitting said sorted data to a service center associated with said region;

a service center in electrical communication with said receiving center, said service center comprising means for receiving said sorted data, sorting said sorted data by line of route distribution including addressee address, printing said overlay, and affixing said overlay to an envelope, said envelope and contents thereof comprising at least one mail item; and a delivery center in distribution communication with said service center and assigned to said addressee address, said delivery center comprising means for printing said data as mail items according to line of route distribution order and distributing said mail item according to said line of route.

* * * * *